Oct. 12, 1965   MINORU HARA   3,211,997
FAULT LOCATING MEANS FOR ELECTRIC POWER TRANSMISSION
LINES, HAVING MEANS FOR RECORDING, REPRODUCING AND
DISPLAYING TRANSMITTED AND REFLECTED SIGNALS
Filed Jan. 13, 1960   2 Sheets-Sheet 1
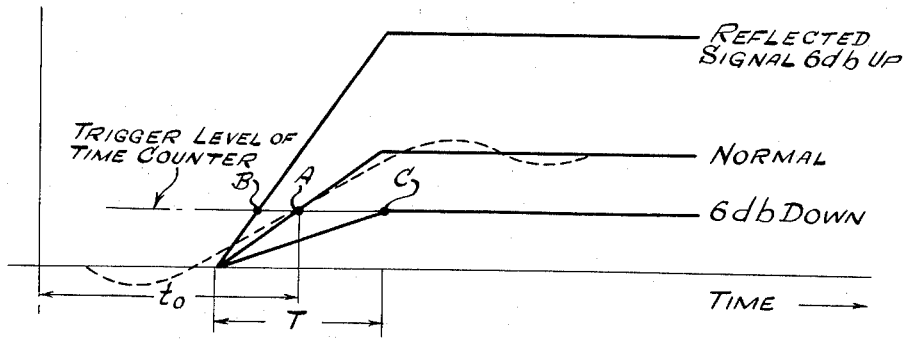
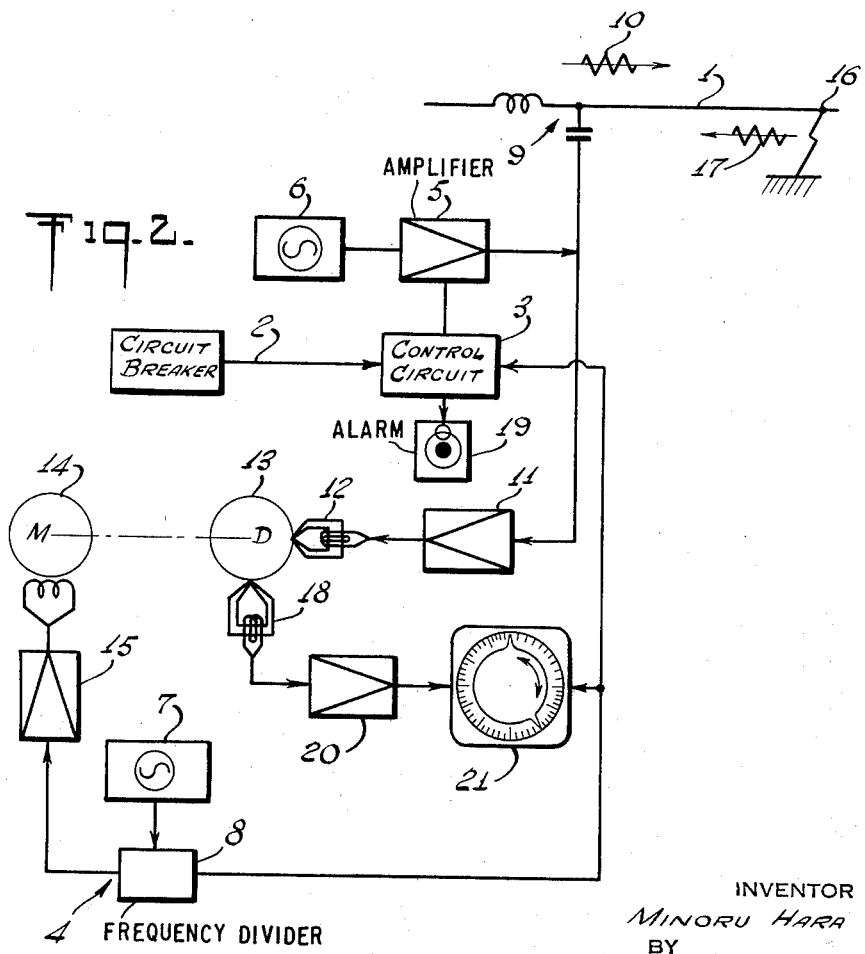
INVENTOR
MINORU HARA
BY
ATTORNEYS

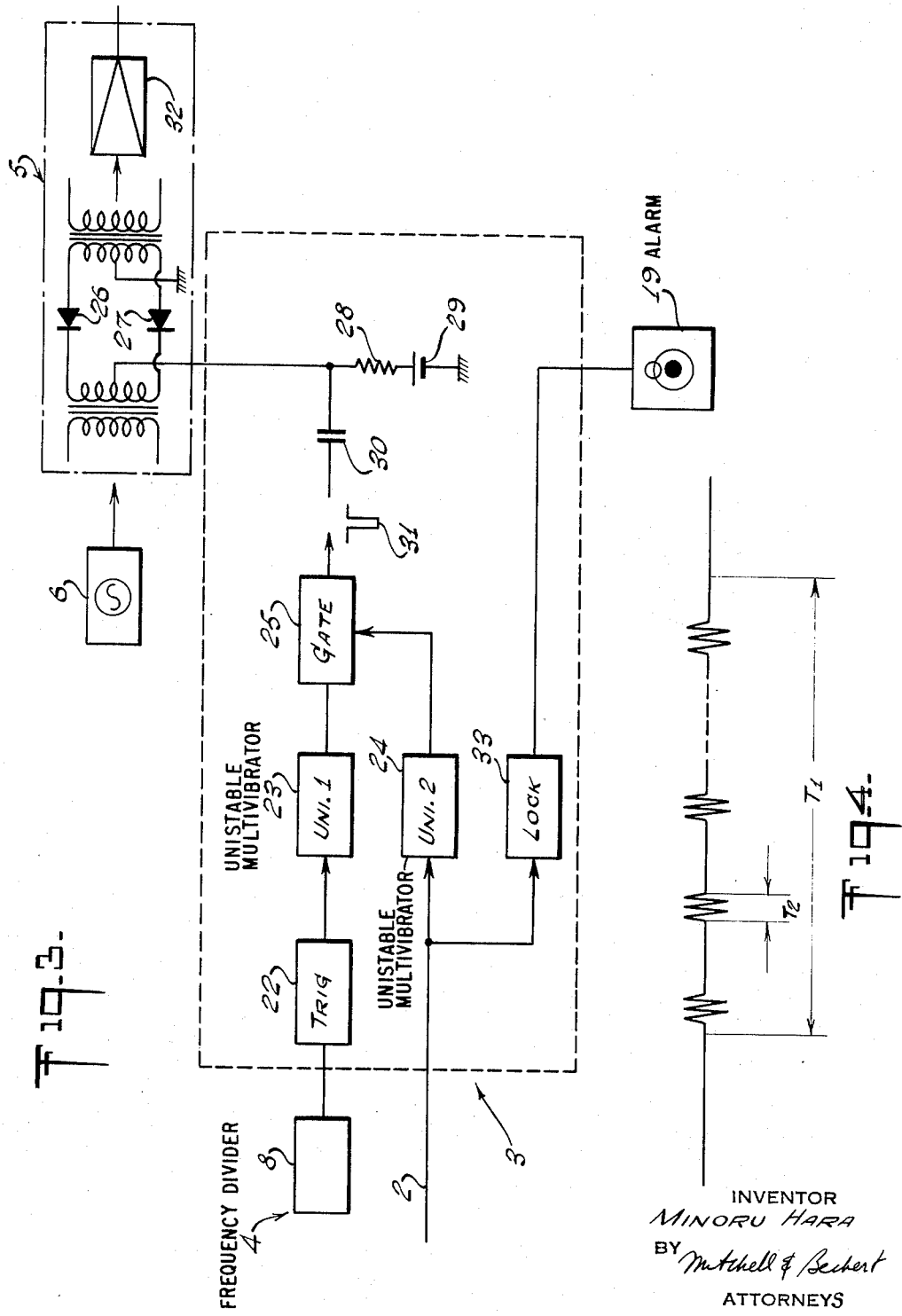

United States Patent Office 3,211,997
Patented Oct. 12, 1965

3,211,997
FAULT LOCATING MEANS FOR ELECTRIC POWER TRANSMISSION LINES, HAVING MEANS FOR RECORDING, REPRODUCING AND DISPLAYING TRANSMITTED AND REFLECTED SIGNALS
Minoru Hara, Tokyo, Japan, assignor to Nippon Electric Company Limited, Tokyo, Japan, a corporation of Japan
Filed Jan. 13, 1960, Ser. No. 2,221
2 Claims. (Cl. 324—52)

This invention relates to equipment for locating a point of fault in an electric power transmission line, and more particularly to such equipment in which a point of fault is located by measuring a time interval between a transmitted pulse and a reflected pulse from the point of fault.

It is ordinarily difficult to locate a fault point in an electric power transmission line while it is "live," because localization must be made during the time that an electric arc is formed at the fault point. This time is usually very short. As is well known, this restricted period of time is peculiar to power transmission lines and the problem has no analogy in the communication line. In a power line equipped with a high-speed power line carrier protection relay system, a circuit breaker operates less than several commercial frequency cycles after occurrence of a fault; therefore, the fault must be localized within this short period of time.

In conventional fault-locating equipment for electric power transmission lines it has been the practice to measure the time interval between a single direct-current or alternating current signal which is sent out several milliseconds after the occurrence of a fault. The time interval is generally provided to eliminate the noise which occurs immediately after the occurrence of a fault. The transmitted signal is reflected back from the fault point and the propagation and reflection time is measured by an electric time-counter circuit. The time-counter circuit is started by the transmitted signal and stopped by the reflected signal. In such equipment, however, satisfactory results have not been obtained, because the electric time-counter circuit is often triggered into erroneous operation or becomes inoperative due to disturbances caused either by noise, a cut in the power line, or a transposition.

Accordingly, a comparatively satisfactory result has been obtained experimentally by taking photographs of the transmitted and reflected signals by means of a camera, auxiliary to the electric time-counter system, and by measuring the time interval between the signals on the photographic film. Such equipment, however, is extremely complex, and impractical because the film must be developed after each use.

It is, therefore, an object of the invention to eliminate the above-mentioned shortcomings in the conventional fault-locating equipment for power transmission lines.

In accordance with an aspect of the invention, there is provided equipment for determining the exact location of a fault in a power transmission line by measuring the time interval between a signal transmitted from the equipment to the power line and the signal reflected from the point of fault. The invention is characterized in that the transmitted signal is composed of a plurality of pulses which are repeated at a predetermined time interval. The transmitted and reflected pulse trains are recorded and reproduced on a medium which permits simple and rapid determination of the time interval between the transmitted and reflected pulses.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 shows schematically wavefronts of a reflected signal at three different levels;
FIG. 2 is a block diagram of an embodiment of this invention;
FIG. 3 is a block diagram of a control circuit shown by block diagram in FIG. 2; and
FIG. 4 shows a train of pulses used by the equipment of the invention.

A serious weakness of the conventional fault-locating equipment of the type mentioned above, wherein an electric time-counter system is used and where the transmission frequency band of the power line is restricted, is that the wavefront of the reflected signal has comparatively small gradient as shown by dotted line in FIG. 1. The waveform or envelope of the reflected signal may be given by the following equation:

$$e(t) = E[\tfrac{1}{2} + 1/\pi Si\ (\overline{w_0 t - t_0})]$$

where $w_0 = \pi \Delta f$, and
$\Delta f =$ transmission bandwidth.

If this waveform is approximated by a trapezoidal waveform as shown by solid lines in FIG. 1, the build-up time T of the wavefront is:

$$T \doteq 1/\Delta f$$

By presetting the trigger level of the time counter at a predetermined level shown by dot-and-dash line in FIG. 1, the time of arrival of the reflected signal as measured by the time-counter depends on the level of the reflected signal. The points A, B and C suggest the time of arrival of the three reflected signals of different amplitudes. These three points would incorrectly indicate different fault locations.

Errors produced by the conventional fault-locating equipment for different levels of reflected signals varying 6 db above and 6 db below a predetermined normal level, are as follows for three typical transmission bands:

| Trans-mission Band | Errors in Measurement | |
|---|---|---|
| | Reflected Signal Increased by 6 db | Reflected Signal Decreased by 6 db |
| 10 kc | −25 sec.≑7.5 km. shorter | +50 sec.≑15.0 km. longer. |
| 20 kc | −12.5 sec.≑3.75 km. shorter | +25 sec.≑7.5 km. longer. |
| 100 kc | −2. sec.≑0.75 km. shorter | +5 sec.≑1.5 km. longer. |

Such error in measurement is the primary shortcoming of the fault-locating system which transmits only a single signal and uses a conventional time-counter to measure the time interval between the transmitted and reflected signals.

Referring now to FIG. 2, there is shown an embodiment of the invention. Conventional protection relay equipment (circuit breaker) is connected to an electric power transmission line 1 and sends out a signal, which may be termed a fault-occurrence signal, upon the occurrence of a fault in the power line 1. As is well known to those skilled in the art, a circuit breaker comprises a coil which when energized or deenergized as the case may be acts to open or close contacts to break a circuit. The fault-occurrence signal therefore is derived from the coil structure and not from the contacts. The fault-occurrence signal is applied over a signal wire 2 to a control circuit 3. As will later appear in detail, circuit 3, under control of an auxiliary oscillator shown generally at 4, gates a transmitter amplifier 5, which is fed by an oscillator 6, to produce a train of pulses such as shown in FIG. 4.

The auxiliary oscillator 4 comprises a crystal oscillator 7, and a frequency divider 8 for dividing the frequency of the oscillator into an integral submultiple.

The pulse train as shown at 10 is applied over coupling elements 9 to the power line 1. At the same time, the pulse train is applied to a receiver-amplifier 11 and the amplified pulse train is applied to a recording head 12 of a magnetic recorder 13. The magnetic recorder, preferably of the drum type, is caused to rotate continuously by a synchronous motor 14, the motor being driven at a constant speed by electric power from a power amplifier 15. The power amplifier derives its energy from the auxiliary oscillator 4.

Meanwhile, the transmitted pulses 10 are reflected at the point of fault 16, such as suggested by the reflected pulses 17. The reflected pulses 17 are fed to the receiver-amplifier 11 and the amplified replica pulses are applied to the recording head 12. It will be noted, therefore, that the transmitted and reflected pulses 10 and 17 are both recorded on the recording medium of the recorder 13. In the recorder 13, shown in FIG 2, a reading head 18 is provided. It is to be understood, however, that only one head may be used both as the recording and reading head. Further, although a magnetic memory drum such as used in the ordinary electronic computer is preferred to the usual tape recorder, it is evident that any suitable recording equipment may be used as the storage device.

Upon termination of the pulse train, a suitable alarm 19, such as a lamp or a bell, automatically notifies the operator of the occurrence of a fault and completion of the recording. The operator then connects into operation the reading head 18, and the output thereof is supplied to a reading amplifier 20, and the output from the amplifier to a cathode-ray tube 21 where both the transmitted and reflected pulses are reproduced on the cathode-ray tube screen. The time axis of the cathode-ray tube is controlled by the output of the auxiliary oscillator 4, by synchronizing the rate of the time base to that of the pulse repetition rate of the transmitted pulses. Pulse marker indications are obtained representing the transmitted pulses 10 and the reflected pulses 17, respectively. Although the cathode-ray tube 21 shown in FIG. 2 is of a circular time-base type, it should be understood that a cathode-ray tube of linear time-base sweep may be used. Obviously, other reproducing arrangements could also be employed to reproduce the time displacement between the transmitted and reflected pulses.

In FIG. 3, the control circuit 3 and the associated circuits are shown in detail. As has been described, the output of the frequency divider 8 of the auxiliary oscillator 4 is applied to the control circuit 3, shown within the dashed rectangle. The frequency-divided sinusoidal wave operates a trigger pulse generator 22. The generator 22 delivers a continuous series of pulses which are synchronized with the sinusoidal wave and which are used to trigger a unistable multivibrator 23. Thus triggered, the multivibrator 23 produces a continuous series of pulses, each pulse of which has a predetermined width corresponding to the time duration shown by $T_2$ in FIG. 4. The fault-occurrence signal sent through the signal wire 2 to the control circuit 3 triggers a second unistable multivibrator 24 to produce a single pulse (not shown) which also has a predetermined width corresponding to the time duration shown by $T_1$ in FIG. 4, and which is used in preparing a conventional gate 25. It will be appreciated, therefore, that subsequent to the occurrence of a fault, the gate 25 is opened for the time duration $T_1$ and a train of a predetermined number of pulses are gated therethrough.

This pulse train is sent from the control circuit 3 to the transmitter amplifier 5 shown in FIG. 3 within the dash-dot rectangle. In the amplifier 5, there are rectifier gates 26 and 27 which are normally biased in the reverse direction through a resistor 28 and a battery 29. However, when the pulses 31 in the pulse train are applied over capacitor 30, the back bias on the rectifier gates 26 and 27 is overcome and permits the oscillating energy generated by the oscillator 6 to pass through the gate circuit. Thus, a second pulse train shown in FIG. 4 is obtained, each pulse being composed of an oscillatory wave of time duration $T_2$, the train being of time duration $T_1$. This is the pulse train transmitted from the amplifier 5 (or more specifically amplifier 32) of the fault-locating equipment to the power line 1.

A part of the fault-occurrence signal operates a lock circuit 33 which energizes the alarm 19. Alternatively, the alarm 19 may be set into operation by termination of the single pulse produced by the second unistable multivibrator 24.

One of the important features of the invention is that a predetermined number, say several tens, of the transmitted and reflected pulses are reproduced as paired stationary images on the cathode-ray tube. The intensity or brightness of the pair of screen images is proportional to the number of pulses. The impulse potential or the noise current produced by the arc formed at the point of fault has no regular repetition rate or any fixed time relation to the period of the pulses used in the invention. The noise current will, therefore, be reproduced at random time positions on the reproducing medium so that the intensity of the reproductions of the noise current will be substantially zero. This results in a great improvement in the signal-to-noise ratio as compared with the conventional systems. The greatly improved signal-to-noise ratio permits a reduction in the required energy for the transmitted pulses as compared with a conventional fault-locating equipment.

Since the transmitted and reflected pulses are recorded on a recording medium, there is no problem in regard to determination of the fault-location within a specified short interval of time; e.g., of the order of milliseconds after the occurrence of a fault. Furthermore, the pulses being recorded on a reproducing medium as described above eliminates errors in the time-counter circuit which would have resulted from the gradual build up of the reflected signal.

It is obvious that the reproduction could be made a desired time after recording and that upon reproducing the record, the reproduction could be elongated along the time axis by operating the recording equipment at a slower speed.

While the foregoing description sets forth the principles of the invention in connection with specific apparatus, it is to be understood that this description is made only by way of example and not as a limitation of the scope of the invention as set forth in the objects thereof and in the accompanying claims.

I claim:

1. A power transmission line fault locating system, comprising means responsive to the occurrence of a fault on said line for producing a recurring train of pulses of predetermined time duration and spacing within a single time period per fault occurrence, oscillation means gated by said train of pulses for transmitting along said line a train of pulse bursts having a time duration and spacing equivalent to said train of pulses, the bursts being reflected at the point of fault, means for receiving the reflected bursts, a recorder having a moving recording medium, scan-type reproducing means coupled to the output of said recorder and having a scanning rate equal to the repetition rate of said bursts or multiple thereof, means for synchronizing the movement of said recording medium with the scanning rate of said reproducing means, means for coupling said trains of transmitted bursts and reflected bursts to said recording medium in the order of their occurrence in the system, whereby paired replicas of the train of transmitted burst and the train of the reflection thereof are reproduced, the location of the fault being a function of the time interval between said paired replicas of bursts, said fault responsive means comprising an oscillation generator, a normally inoperative transmitter coupled to the output of said generator, a dual input gating means for controlling the operation of said transmitter, a protective device for said transmission line adapted to apply one input to said gating means during the existence of a fault on said line, means for producing an alternating current wave of predetermined frequency, means for applying said wave to said reproducing means for controlling the scanning rate thereof, and to the other input of said gating means, whereby the gating means renders said transmitter operative at the periodic intervals determined by the frequency of said wave, said gating circuit comprising a pair of univibrators, means responsive to said wave for triggering a first of said univibrators into operation, said first univibrator being adapted to produce periodic pulses of predetermined time duration and spacing for controlling the duration and spacing of said bursts, means coupling said protective device to the second univibrator for operating said univibrator in response to a fault on said line, a dual input gate circuit coupled to the outputs of said univibrators, whereby said gate circuit produces pulses in correspondence with said periodic pulses, and means for applying said periodic pulses to said transmitter for the operation thereof, said transmitter including a pair of gated diodes in a circuit coupling the input and output of said transmitter, means for normally biasing said diodes in the nonconducting direction, said periodic pulses being applied to said gated diode circuit and being capable of overcoming sad bias, thereby causing said diodes to conductively couple the input to the output of said transmitter, said reproducing means comprising a cathode ray tube of the circular time base type, said recorder comprises a magnetic drum, a writing head, said means for receiving said reflected bursts having an output coupled to said writing head, motor means for rotating said drum at a predetermined speed related to the scanning rate of said reproducing means, means for applying said alternating curernt wave to said motor means for regulating the speed thereof, a reading head for said magnetic drum, and means for applying the output of said reading head to said reproducing means.

2. An electrical apparatus for accurately determining the distance at which a fault in a power transmission line occurs substantially immediately after the occurrence of a fault as indicated by a fault-occurrence signal which appears across a circuit breaker connected to said line, comprising means producing a first set of signals comprising a plurality of discrete equally spaced apart bursts of oscillations for a predetermined time in response to the receipt of said fault-occurrence signal, connecting means coupled to said circuit breaker applying said first set of signals to said power transmission line, said connecting means being responsive to a changed condition of said circuit breaker to provide a control condition of said circuit breaker to provide a control signal, biased gating means for electrically decoupling said first producing means from said transmission line in the absence of said control signal, means for receiving a reflected set of signals from said transmission line, means for recording said first set of signals and the reflected set of signals on a recording medium, means for reproducing said signals from said recording medium at a first rate to produce output signals representing the recorded first set of signals and the recorded reflected set of signals, means for displaying said output signals on a scanning display device at a predetermined scan rate, said scan rate and said first rate being correlated so that a predetermined number of said bursts of said first set are reproduced as paired stationary images.

References Cited by the Examiner
UNITED STATES PATENTS

| | | | |
|---|---|---|---|
| 2,602,834 | 7/52 | Leslie | 324—52 |
| 2,709,784 | 5/55 | Spaulding | 324—52 |
| 2,800,627 | 7/57 | Oudin | 324—52 |

WALTER L. CARLSON, *Primary Examiner.*

SAMUEL BERNSTEIN, *Examiner.*